United States Patent [19]

Keblys

[11] 4,036,809
[45] July 19, 1977

[54] HALOGEN-CONTAINING DIPHOSPHONATES

[75] Inventor: Kestutis A. Keblys, Southfield, Mich.

[73] Assignee: Ethyl Corporation, Richmond, Va.

[21] Appl. No.: 618,890

[22] Filed: Oct. 2, 1975

Related U.S. Application Data

[60] Continuation-in-part of Ser. No. 549,518, Feb. 13, 1975, abandoned, which is a division of Ser. No. 351,809, April 16, 1973, abandoned.

[51] Int. Cl.² .............................................. C08K 5/53
[52] U.S. Cl. ................................. 260/45.7 P; 260/932
[58] Field of Search ........................... 260/45.7 P, 932

[56] References Cited

U.S. PATENT DOCUMENTS

| | | | |
|---|---|---|---|
| 2,779,701 | 1/1957 | Robitschek et al. | 260/861 X |
| 3,177,208 | 4/1965 | Stilz et al. | 260/932 X |
| 3,325,569 | 6/1967 | D'Alelia | 260/932 |
| 3,547,878 | 12/1970 | Sonides | 260/45.7 P X |
| 3,929,688 | 12/1975 | Honig | 260/45.7 P X |

*Primary Examiner*—Sandra M. Person
*Attorney, Agent, or Firm*—Donald L. Johnson; John F. Sieberth; Robert A. Linn

[57] ABSTRACT

Compounds such as tetramethyl [(2,3,5-tetrabromo-p-phenylene)-dimethylene] diphosphonate are useful as flame retardants in polymers and resins such as unsaturated polyesters and polyester fibers, polystyrene, and the like.

3 Claims, No Drawings

HALOGEN-CONTAINING DIPHOSPHONATES

CROSS-REFERENCE TO RELATED APPLICATIONS

This is a continuation-in-part of now abandoned application Ser. No. 549,518, filed Feb. 13, 1975, which in turn is a division of now abandoned Application Ser. No. 351,809, filed Apr. 16, 1973.

SUMMARY OF THE INVENTION

In one aspect, this invention provides a compound having the formula

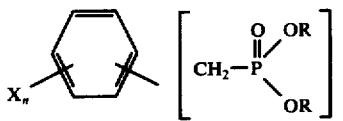

(I)

wherein X is chlorine or bromine, $n$ is 2–4, and each R is alike or different and selected from lower hydrocarbyl groups.

In a preferred embodiment, this invention provides α,α'-bis- (dimethoxyphosphinyl) tetrabromo-p-xylene. This compound is represented by the above structural formula when each "X" is bromine, and each "R" is methyl.

This invention also provides as a composition of matter an unsaturated polyester resin stabilized with a flame retardant amount of a compound of (I), said resin being prepolymer, made by esterification of dihydric alcohol with an acid moiety selected from unsaturated and saturated dicarboxylic acids and anhydrides, crosslinked with an unsaturated monomer.

Further, this invention provides styrene polymers such as polystyrene and ABS made fire retardant by the above described compounds.

In another aspect, this invention also provides as a composition of mater a polyester fiber stabilized by a fire retardant amount of a compound of (I), said polyester being the ester product of a lower alkylene glycol and a phthalic acid.

DESCRIPTION OF PREFERRED EMBODIMENTS

The compounds of this invention are made by reacting a phosphite with an α,α'-dihaloxylene. Of the α,α'-dihaloxylenes, those with up to four bromines substituted on the benzene ring are preferred, but it is to be understood that they can also be chlorine. A chlorine or bromine atom may be substituted on each methyl group; preferably bromine atoms are substituted.

Thus, a preferred starting material for compounds of this invention are α,α',2,3,5,6-hexabromo-p-xylene.

These compounds and their preparation are described in Dubeck, M, and Brackenridge, D., Halogenated Xylenes, Application Ser. No. 70,922, filed Sept. 9, 1970. The portions of that application dealing with the α,α'-dibromoxylenes and their preparation are incorporated by reference herein as if fully set forth.

The exact nature of the phosphite used as a starting material is no critical, so long as at least one of the radicals attached to oxygen is an aliphatic hydrocarbyl group. The radicals attached to the oxygen atoms are preferably stable under the reaction conditions employed, at least to an appreciable extent. Likewise, they preferably do not unduly retard the reaction by being so bulky as to cause steric hindrance or by being so extraneously reactive as to undergo an untoward amount of side reactions. Thus, preferred phosphites have radicals which are simple, stable, and not extraneously reactive. Exemplary phosphites are $(BrC_6H_4O)_2POCH_3$, $(Br_3C_6H_2O)_2POCH_3$, $(Br_3C_6H_2O) P(OCH_3)_2$ and

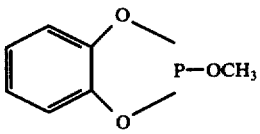

Other radicals may be selected from those set forth in column 3, line 15 -column 5, line 17 of U.S. Pat. No. 2,818,416, which portion of the patent is included by reference herein as if fully set forth. Of these radicals, the lower radicals are preferred. Thus, it is preferred to use phosphites having R groups of up to about 9 carbon atoms. Alkyl, aryl, aralkyl, and alkaryl radicals of this type are preferred because of their availability.

The R groups in the phosphites may be alike or different. Preferably, all are the same (simple phosphites) though it is to be understood that phosphonates of this invention can have dissimilar R groups made by reacting phosphites with a plurality of R groups (mixed phosphites). Likewise, dissimilar R groups in the compounds of this invention can be made by using a mixture of phosphites (simple or mixed).

Highly preferred compounds of this invention have the formula:

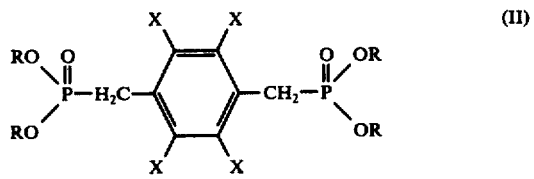

(II)

wherein X is chlorine or bromine and the various R's are alike or different and selected from hydrocarbyl and halosubstituted hydrocarbyl groups of from one to about 9 carbon atoms. Of these, the most preferred have four bromine atoms indicated by X and the R groups are the same. It is to be understood that the R groups can have various substituents which do not interfere with the preparative process, such as chlorine or bromine.

In conducting the process, one can use a stoichiometric quantity of reactants, but it is not necessary to do so. One can employ an excess of either reactant. In many instances, it is best to use an excess of the phosphite in order to assist di-substitution of the halogenated xylene. In general, one uses from 2 to 5 or more moles of phosphite for every mole of halogenated phenol. There is no real upper limit on the excess of either reactant, and in many instances, good results are obtained when from about 2 to about 3 moles of phosphite are utilized per each mole of halogenated xylene.

When this process is conducted, a hydrocarbyl halide is formed as a by-product. If desired, one can remove this substance in order to assist reaction. Removal of by-product organic halide by distillation is preferred.

For this process, one prefers to use a liquid reaction medium. Organic substances which do not interfere with the course of the reaction can be used. Typical substances are hydrocarbons such as petroleum ether, n-heptane, benzene, toluene, and the like. The amount of liquid reaction medium employed is not critical. In general, one uses from 1 to 10 to 125 or more moles of liquid reaction medium per each mole of halogenated xylene employed. It is understood that there is no real upper limit on the amount of liquid reaction medium, this being determined by such secondary characteristics as economics, size of the reaction vessel, and the like.

In conducting the process, one employs a temperature which affords a reasonable rate of reaction and does not cause an untoward amount of undesirable side reactions. The exact reaction temperature employed is not critical. In general, one uses slighly elevated temperatures such as from about 80° to about 250°C. In general, the reaction is conducted under ambient pressures since these are most economical. However, the reaction pressure is not critical. Superatmospheric and subatmospheric pressure can be utilized if desired. In general, vacuum or partial vacuum offers no material advantage. Elevated pressures, say up to 1,000 psig or more, can be utilized when it is desired to conduct the process at a temperature above the normal boiling point of one or more materials in the reaction mixture.

The reaction time is not critical, but depends to some extent on the inherent reactivity of the reactants and other reaction conditions employed. In general, reaction times of from about one-half hour to ten days are sufficient.

EXAMPLE I

A round bottom flask was equipped with a magnetic stirrer, heating mantle, and reflux condenser vented to a bubbler. The flask was charged with 28.9 g (0.05 mole) of $\alpha,\alpha'$, 2,3,5,6-hexabromo-p-xylene, m.p. 270.5°-272.5°, 11.9 ml (12.4 g, 0.10 mole) of trimethylphosphite and 200 ml of benzene. The mixture was stirred and refluxed for 2 hours.

There was no evidence of gas evolution ($CH_3Br$) so the mixture was cooled and filtered. The collected solid was washed with benzene and sucked dry, wt. 22.5 g. This solid was recharged to the same apparatus along with 150 ml of xylene and 10 ml (10.5 g, 0.084 mole) of trimethyl phosphite. This mixture was refluxed for 2 hours. The solid dissolved.

The condenser was replaced with a short Vigreux column and distilling head. The solution was distilled partially, max. head temperature 138°, to give 39.4 g of distillate. The head temperature did not level off at 110°, the b.p. of trimethyl phosphite.

Cooling the remaining solution gave a voluminous precipitate which was filtered off, washed with benzene and allowed to dry, wt. 13.0 g (52.5% yield), m.p. 168°-174.5°. Recrystallizing three times from benzene gave 3.7 g, m.p. 177°-179°. Analysis: Bromine — Calculated, 50.1%. Found, 49.5%; nmr spectrum consistent with structure for $\alpha,\alpha°$-bis(dimethoxyphosphinyl) tetrabromo-p-xylene, which is also the product of Example II.

EXAMPLE II

Trimethyl phosphite was distilled through a short Vigreaux. The portion boiling at 110°-111° was retained and used.

The equipment was the same as Example I, except the condenser was vented to a dry-ice cooled trap. To the vessel was charged 103.5 g (0.179 mole) of hexabromo-p-xylene, 150 ml of xylene and 23.3 ml (24.4 g, 0.197 mole) of trimethylphosphite. Methyl bromide (14.9 g, 80%) was collected in the trap.

The condenser was replaced with a short Vigreux and 33.7 g of xylene distilled over at 135°-137°. On further distillation and cooling, a solid mass formed. The solid was scraped out and filtered off. The filtrate was evaporated to about 20 ml. and cooled. Additional solid formed and was filtered off.

Both solids were recharged to the flask along with 100 ml of xylene and 20 mol (20.9 g, 0.168 mole) of trimethyl phosphite. This was refluxed for two hours. Methyl bromide collected in the trap weighed 12.0 g.

About 20 ml. of xylene was distilled off as before. An attempt to filter after cooling gave solid in the funnel and in the trap. The solids were recrystallized from benzene to give 57.3 g, m.p. 172°-176°.

The filtrates were combined, concentrated to less than 200 ml and triturated with hexane. The precipitate was filtered off, washed with hexane and dried, wt. 38.8 g, m.p. 160°-172° C. This was recrystallized from benzene to give 25.8 g, m.p. 172.5°-176.5°. Total yield 83.1 g (73%).

In a similar manner, triethyl phosphite, tri-n-octylphosphite, bis(tribromophenyl)methylphosphite, bis(phenyl)ethylphosphite, bis(2,5-xylyl)propylphosphite, bis(phenylethyl)methylphosphite, bis(mesityl)methylphosphite can be reacted with $\alpha,\alpha'$,2,3,5,6-hexabromo-p-xylene at a temperature of from 80°-250° C. in benzene, xylene, n-heptane, or No. 9 oil to yield compounds of Formula II where each X is bromine and each R is respectively,
 1. ethyl
 2. n-octyl
 3. tribromophenyl
 4. phenyl
 5. 2,5-xylyl
 6. phenylethyl, and
 7. mesityl.

In a similar manner, the above-identified phosphites can be reacted at the same temperatures and using the same reaction media with $\alpha,\alpha'$,2,3,5,6-hexabromo-o-xylene, and $\alpha,\alpha'$,2,3,5,6-hexabromo-m-xylene to yield the corresponding materials. For example, ethylphosphite and the o- and m-hexabromoxylene yield respectively,
 8. $\alpha,\alpha'$-bis(dimethoxyphosphinyl) tetrabromo-o-xylene, and
 9. $\alpha,\alpha'$-bis(dimethoxyphosphinyl) tetrabromo-m-xylene.

Also, $\alpha,\alpha'$,2,5-tetrabromo-p-xylene and $\alpha,\alpha'$,2,3,5-pentabromo-p-xylene react with methyl phosphite to yield respectively,
 10. $\alpha,\alpha'$-(dimethoxyphosphinyl)- 2,3-dibromo-p-xylene, and
 11. $\alpha,\alpha'$-dimethoxyphosphinyl)- 2,3,5tribromo-p-xylene.

Polyesters include liner and crosslinked polymers. The linear materials are prepared by reacting di-acids with glycols and are thermoplastic in nature. Typically, the glycol is ethylene glycol and the acid is isophthalic or terephthalic acid. Fibers can be spun from such materials.

A larger group of polyesters is the unsaturated resins. These are used for reinforced shapes and coatings. For these resins, unsaturated acids or alcohols are incorporated in the polymer. By "unsaturated" is meant the presence of an active carbon-to-carbon double bond.

Through this, unsaturated crosslinking is achieved. For example, if some of the phthalic acid in the polymer above is replaced by maleic acid, then crosslinking can be achieved using divinylbenzene or styrene. To achieve this crosslinking, a curing agent is mixed with the polymerizable mixture; typically, the curing agent is an organic peroxide.

Unsaturated polyesters of this type are called alkyd resins in the paint industry. They have many advantageous properties such as strength, weather resistance, pigmentability, etc.

As well known, unsaturated polyester resins are based on prepolymers which are made by the esterification of dihydric alcohols with unsaturated and modifying dibasic acids and or anhydrides. The unsaturated polymer is mixed with an unsaturated monomer (e.g. styrene) with which it crosslinks. A catalyst, polymerization inhibitor and inert filler are among the typical additives.

Polyester fibers are made by direct esterification, for example, reaction of terephthalic acid with ethylene glycol, or by transesterification. In the latter route, there is a catalyzed exchange of ethylene glycol for methyl groups of dimethylterephthalate. The liberated methanol is removed by distillation to drive the exchange to completion. The 2ethylenephthalate so formed undergoes polycondensation, usually in the presence of a catalyst, to form the polymer. This may be broken into chips, blended and remelted before spinning. Alternately, the polymer can be made and continuously fed to spinnarets.

Polyester resins of the above types are well known in the prior art; cf. for example, U.S. Pat. Nos. 2,909,501; 3,285,995; 3,309,425; 3,434,981; and Unsaturated Polyesters, Boeing, Elsevier Publishing Co., New York, N.Y. (1964). Descriptions of such resins in these works are incorporated by reference herein as if fully set forth. Some unsaturated resins which are articles of commerce are, for example, the Glaskyd and Laminac Resins made available by American Cyanamid Company. invention In accordance with this invention, flame resistance-enhancing amount of condensation product of a diphosphonate of this invention is admixed with a polyester of the classes described above. The mixing can be accomplished by any technique suitable to a skilled practitioner. Thus, for example, the flame retardant agent can be thoroughly mixed with molten polymer before feeding to the spinnaret. Furthermore, the agent can be milled or molded with the resin, or blended with a prepolymer-unsaturated monomer mixture. In general, from about 2 to about 40 weight percent or more additive is used. More preferably, from about 5 to about 30 weight percent additive is employed and most preferably from about 10 to about 20 weight percent Tests designed to indicate flame retardance which can be used to demonstrate flame resistance of polyester compositions are set forth in U.S. Pat. Nos. 2,909,501; 3,285,995; 3,434,981, and 3,309,425.

EXAMPLE III

Fiber grade polyethylene terephthalate (PET) chips were pulverized, dried in a vacuum oven at 100° C. and cooled on a dessicator. The dried PET powder (22.5 g) was mixed with 2.5 g of powdered flame retardant, α,α'-bis(dimethoxyphosphinyl)tetrabromo-p-xylene, and spread evenly on a mirror-finished aluminum foil on a 7 inches × 8 inches stainless steel mold. The sample was covered with 10 denier fiber glass gauze and with another layer of aluminum foil. The mold was closed, placed into a heated press, heated to 280° for 2.0 minutes and held at 280° and 6,000 psi for 2 minutes. After cooling, the mold was removed from the press. The resulting fiberglass supported PET sheet was removed from the mold and cut into 7 inches × 2 inches × 20 mil specimens, which were conditioned at 73° F. and 50% relative humidity for 24 hours prior to testing.

Flammability of PET specimens was determined by ASTM D-2863 Oxygen Index Test.

The LOI of the PET sample containing 10% by weight of diphosphonate was 29.7

The LOI of the PET sample without the flame retardant was 20.5

In a similar fashion, compounds 1-12 yield flame retardancy in polyethylene terephthalate when employed at 5-30 weight percent cent additive. Similarly, the same compounds show flame retardancy in a rigid polyester. A rigid polyester can be prepared as follows.

A polyester resin, Polylite 31-007 from Reichold Chemical Corp., 57 parts, is blended with 43% styrene and the amount of additive required for the desired concentration. The mixture is cured at 50° C. overnight using 1% benzoyl peroxide. Thereafter, it is postcured at 80° C. for 3 hours. Flame retardance can be demonstrated by the Limited Oxygen Index standard test, LOI.

Besides poly(ethylene terephthalate), other polyesters can be used. Thus, the diols and esters used in preparation of the polyesters can be selected from those known in the literature.

Thus, the polyesters can be obtained from the reaction of glycols of the general formula

wherein x is an integer from about 2 to 10. Such glycols include ethylene glycol, which is a preferred glycol, 1,3-propanediol, 1,5-pentanediol, 1,6-hexanediol, 1,7-heptanediol, 1,8-octanediol, 1,9-nonanediol, 1,10-decanediol, 2,2-dimethyl-1,3-propanediol, 2,2-bis(-bromomethyl)-1,3-propanediol, or the like. These glycols, and particularly the preferred glycols, ethylene glycol and 1,4-cyclohexane dimethanol, are reacted with dicarboxylic acids or suitable esters thereof, preferably terephthalic acid or dimethyl terephthalate, or other dibasic acids including 2,5-dibromoterephthalic acid, isophthalic acid, diphenyl-4,4'-dicarboxylic acid, naphthalene-2,5-dicarboxylic acid, adipic acid, sebacic acid, succinic acid, oxalic acid, glutaric acid, pimelic acid, suberic azelaic acid, and the like. In addition to being useful with polyesters derived from the more common diols and dicarboxylic acids, the brominated diol may be used as a reactive intermediate with other reactants including glycerol, sorbitol, pentaerythritol, methoxypolyethylene glycol, neopentyl glycol, monohydroxypivalate, trimethylolpropane, trimesic acid p,p'-dicarboxydiphenylmethane, p,p'-dicarboxydiphenoxyethane, p-carboxyphenoxyacetic acid, and the like.

As appreciated in the art, the dibasic acids mentioned above such as adipic acid, azelaic acid or dimer acids are generally used to improve the dyeability of the polyester. Sulfonated isophthalic acid may also be employed for this purpose. In general, the amounts of these reactants should not exceed about 3 mole percent of the polyester.

As appreciated in the art, the molecular weight of the polyester must be sufficient to form a suitable fiber if that is the intended purpose of the polyester. Thus, it is preferred to prepare polyesters of the type described above having a number average molecular weight in the range of about 10,000 to about 50,000.

The compositions of this invention can also be used as fire retardants for polyurethanes, such as rigid and flexible polyurethane foams.

Polyurethane foams are formed from compositions comprising:
  i. a polymer containing free hydroxyl groups such as hydroxyl-terminated polyesters or hydroxyl-terminated polyethers,
  ii. a polyisocyanate, and
  iii. a foaming agent. Usually, other materials are added to the composition to be foamed such as
  iv. catalysts,
  v. plasticizers, and
  vi. emulsifiers, for example.

The polyesters may be derived from a reaction product of a dicarboxylic acid such as adipic acid, and a dihydric alcohol such as ethylene glycol, and may be modified by a material such as trimethylolpropane; confer pages 20–21 of Ferrigno, *Rigid Plastic Foams*, Reinhold Publishing Corp., New York, N.Y. (1963).

The polyethers are ethylene oxide and propylene oxide adducts of polyhydric alcohols and are described on pages 10–19 of Ferrigno, supra.

Polyisocyanates which can be used are described in U.S. Pat. No. 3,574,149, confer the paragraph bridging columns 3 and 4. Another description of exemplary isocyanates is in U.S. Pat. No. 3,338,846, in the first two paragraphs of Column 8.

Foaming agents such as water and urethanes described from tertiary alcohols are known; confer U.S. Pat. No. 3,338,846. Fluorocarbon blowing agents are described in U.S. Pat. No. 3,574,149.

For other ingredients which can be added to make rigid or flexible polyurethane foams, reference is also made to U.S. Pat. Nos. 3,338,845, 3,338,846, and 3,574,149, all cited above, and incorporated by reference herein as if fully set forth.

For the invention, a fire retardant amount of one or more compounds of this invention is incorporated in the formulations. In general, from about 2 to 40 parts by weight per each 100 parts by weight polyol, and more preferably from 5 to 25 parts per 100 parts by weight polyol are used, it being understood that greater or lesser quantities can be used as desired.

The exact nature of the polyurethane foam or the ingredients admixed to prepare the foam are not critical, since the fire retardancy of the additives is not unduly restricted by the foams or the ingredients from which they are made.

Polycarbonates such as those made from bisphenol A and diphenyl carbonate are also useful substrates in this invention.

Flame retardant compounds of the present invention may be incorporated into the α-olefin polymers, for example, homo and copolymers containing as the major constituent ethylene, propylene, butylene, isobutylene and similar monomer units. Copolymers of the foregoing with the vinyl-type monomers, such as vinyl halides, vinylidene halides, vinyl acetates, vinyl butyrals, butadiene copolymers, acrylonitrile-butadiene-styrene polymers, acrylonitriles, acrylate and methacrylate polymers, for example, acrylic acid, methacrylic acid, methacrylate, ethyl acrylate, propyl acrylate, butyl acrylates, amyl acrylates, hexyl acrylates, and their corresponding alkyl methacrylates, as well as monomers such as trichloroethylene, dimethyl maleate, vinyl butyl ether, butadiene, vinyl alcohol, maleic anhydride, carbon monoxide, ethyl acetate and the like.

Polypropylene is a preferred polypropylene is a preferred polyolefin.

In general, the polypropylene compositions according to this invention can be prepared according to methods known in the art; see KirkOthmer, *Encyclopedia of Chemical Technology*, Volume 14, pages 282–309, Second Edition. Thus, the polymers of polypropylene according to this invention polypropylene compositions suitable for sheet film and filament, fiber, foam, rod, elastomeric polymers and the like are contemplated. Such polymers are suitable for injection molding, blow molding, compression molding, thermoforming or vacuum forming, wire and cable covering and coating applications. Of course, the polypropylene compositions can also contain various known plasticizers, stabilizers, chain terminators, color improvers, delustrants, diluents, reinforcing materials, and the like.

The compounds of this invention are preferably used in amounts corresponding to a polyolefin containing from 10 to 40% by weight of the compound and sufficient to provide a total of from about 5 to 25 percent by weight of bromine in the product.

The polybrominated flame retardants of this invention can be incorporated with polystyrene and other polymers made from α-olefinic aromatic monomers. Preferably, the flame retardants are used with polymers whose flammability is to be reduced below any degree of flame retardancy inherent in the polymer. Accordingly, the flame retardants are ordinarily more useful with polymers that do not contain halogens, or other group that can confer flame retardancy. On the other hand, our flame retardants can be used with halogenated polymers or other polymers having inherent flame resistance when it is desirable to further reduce their flammability.

Preferably the flame retardants are used with solid polymers such as those derived from monomers having up to about 12 carbon atoms and the formula

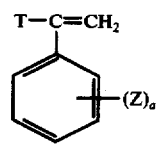

wherein T is hydrogen, $C_1 - C_4$ alkyl, chlorine or bromine, Z is halogen, $C_1 - C_4$ alkyl, or vinyl, and $a$ is a 0 or a small whole number of from 1 to 5. Preferably, the monomer has up to about 10 carbon atoms and the formula

wherein Ar is a benzene nucleus and R is H or methyl. Preferably, the benzene nucleus is derived from benzene or toluene although more highly substituted nuclei can be present. The nucleus may be halogenated with chlorine, bromine or both. Typical monomers are styrene, α-methylstyrene, ortho, meta, and paravinyltoluene, ortho, meta, and parachlorostyrene, and ortho-, meta, and parabromostyrene, divinylbenzene, and the like.

Illustrative polymers are the homopolymers of these monomers such as homopolymers of styrene, chlorostyrene, α-methylstyrene, etc. Copolymers of α-olefinic aromatics such as styrene-α-methylstyrene copolymer, styrene-α-bromostyrene copolymer, and copolymers such as styrene-acrylonitrile copolymers, styrene-methyl methacrylate copolymers, etc.

In a preferred embodiment, solid polymers made from such monomers and having a weight average molecular weight of from about 50,000 to about 1,000,000 are used with the flame retardants of this invention. The molecular weight can be determined by a viscosity technique such as that described for polystyrene on pages 212-213 of Volume 13, *Encyclopedia of Polymer Science and Technology*, Interscience Publishers, a division of John Wiley and Sons.

The flame retardant is added in an effective amount, usually from about 0.1 to about 35 weight percent based on the weight of polymer. Amounts from about 5 – 30 weight percent are preferred, from about 10 to about 25 weight percent are more preferred.

The flame retardant can be used in conjunction with other known additives if desired. In the prior art, antimony oxide is commonly employed with decabromobiphenyl ether when it is used to fire retard polystyrene; U.S. Pat. No. 3,075,944. As shown below, a comparative level of fire retardancy can be achieved without using $Sb_2O_3$ when a polybrominated compound of this invention is employed.

The fire retardants of this invention may be used with synergistic amounts of organic peroxides which are well known for use in fire retarding polymers made from vinyl aromatic monomers such as styrene, isopropyl styrene, tert-butyl styrene, and the like.

By way of example, a high impact polystyrene (such as Styron 475 U-27 from Dow Chemical Company) can be utilized as the substrate to be flame retardant. A sample of that material has a LOI when tested.

Blending with a compound of this invention such as α, α'-bis(dimethoxyphosphinyl)tetrabromo-p-xylene in amount such that 10 or 20 weight percent of such compound is incorporated will give rise to an increase of LOI value showing fire retardancy is conferred by the compound.

Optionally, the compound can be used with $Sb_2O_3$ say, for example, 5 or 10 weight percent based on the amount of polymer.

I claim:

1. As a composition of matter, an unsaturated polyester resin stabilized with a flame retardant amount of a compound having the formula

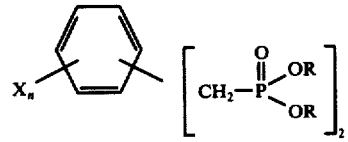

wherein X is bromine, n is 2–4, and each R is alike or different and selected from lower hydrocarbyl groups and, said resin being prepolymer, made by esterification of dihydric alcohol with an acid moiety selected from unsaturated and saturated dicarboxylic acids and anhydrides, crosslinked with an unsaturated monomer.

2. As a composition of matter, a polyester fiber stabilized by a fire retardant amount of a compound having the formula

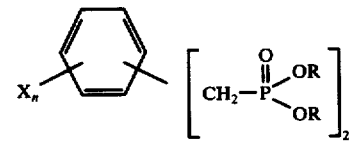

wherein X is bromine, n is 2–4, and each R is alike or different and selected from lower hydrocarbyl groups and, said polyester being the ester product of a lower alkylene glycol and a phthalic acid.

3. Polystyrene stabilized by a fire retardant amount of a compound having the formula

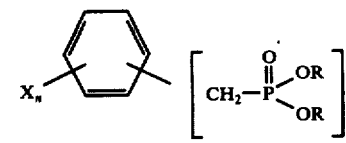

wherein X is bromine, n is 2–4, and each R is alike or different and selected from lower hydrocarbyl groups.